United States Patent [19]

Wilson

[11] 4,281,637

[45] Aug. 4, 1981

[54] CONCENTRATING VACUUM ISOLATED SOLAR ENERGY COLLECTION APPARATUS EMPLOYING REFLECTOR

[76] Inventor: Pryce Wilson, 320 E. Sheridan, Phoenix, Ariz. 85004

[21] Appl. No.: 92,740

[22] Filed: Nov. 9, 1979

[51] Int. Cl.³ .............................................. F24J 3/02
[52] U.S. Cl. .................................. 126/422; 126/435; 126/437; 126/443; 126/450
[58] Field of Search ............... 126/422, 435, 438, 443, 126/450, 437, 417, 419, 421, 422, 432, 434, 436, 445

[56] References Cited

U.S. PATENT DOCUMENTS

| 4,007,729 | 2/1977 | Chao | 126/439 |
| 4,253,445 | 3/1981 | Wilson | 126/422 |

Primary Examiner—Samuel Scott
Assistant Examiner—G. Anderson
Attorney, Agent, or Firm—Warren F. B. Lindsley

[57] ABSTRACT

A concentrating vacuum isolated solar energy collecting and converting apparatus employing transfer means for selectively moving the collected energy back through the vacuum preservation means for useful purposes and employing fluid conducting cover and selectively positionable reflective shield.

14 Claims, 6 Drawing Figures

U.S. Patent  Aug. 4, 1981  Sheet 1 of 2  4,281,637
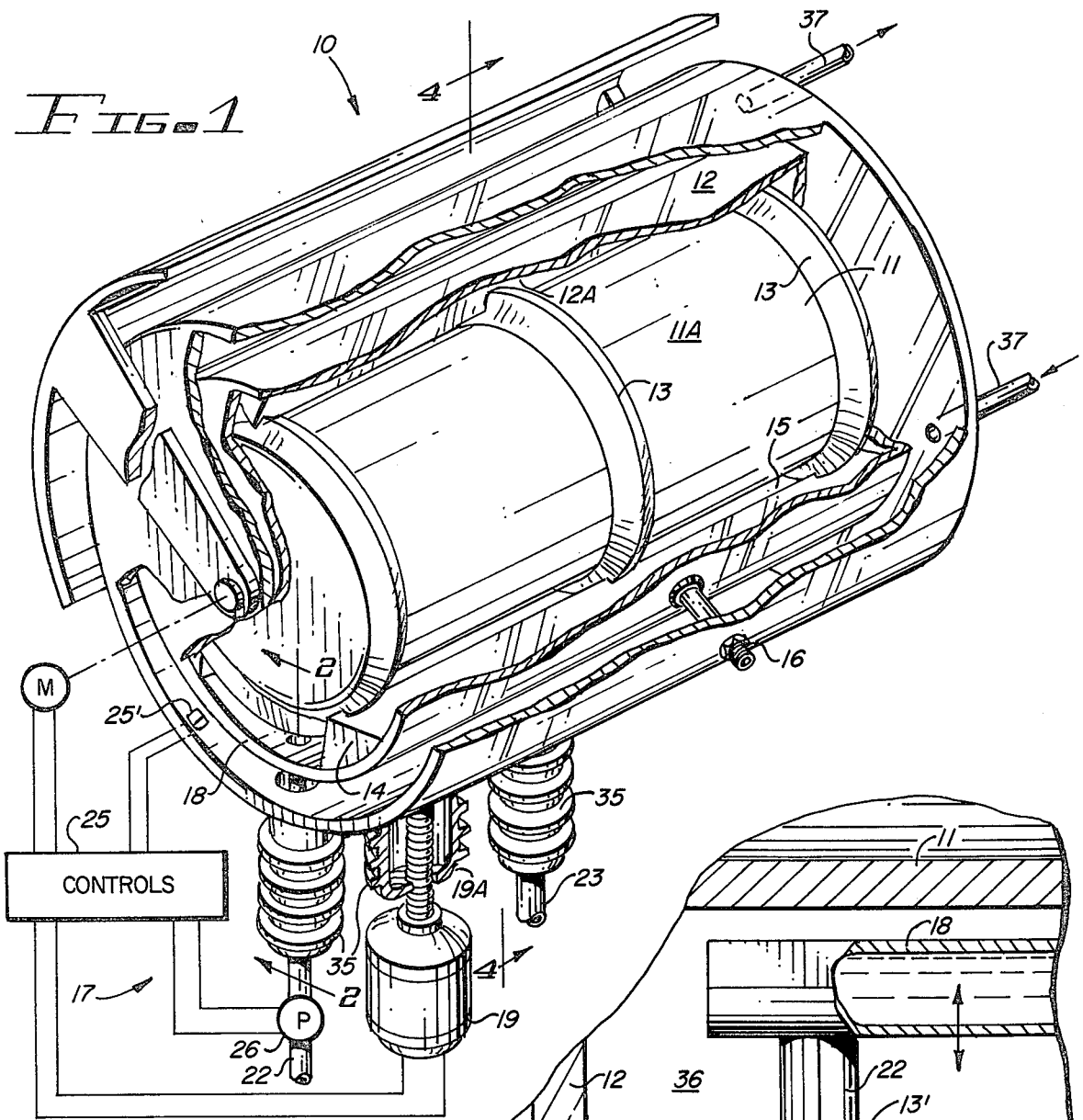
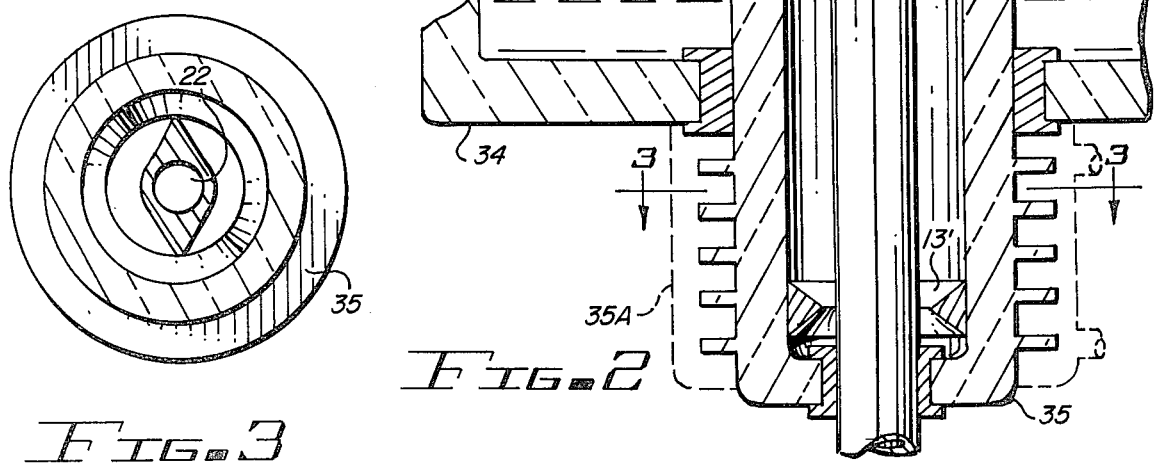

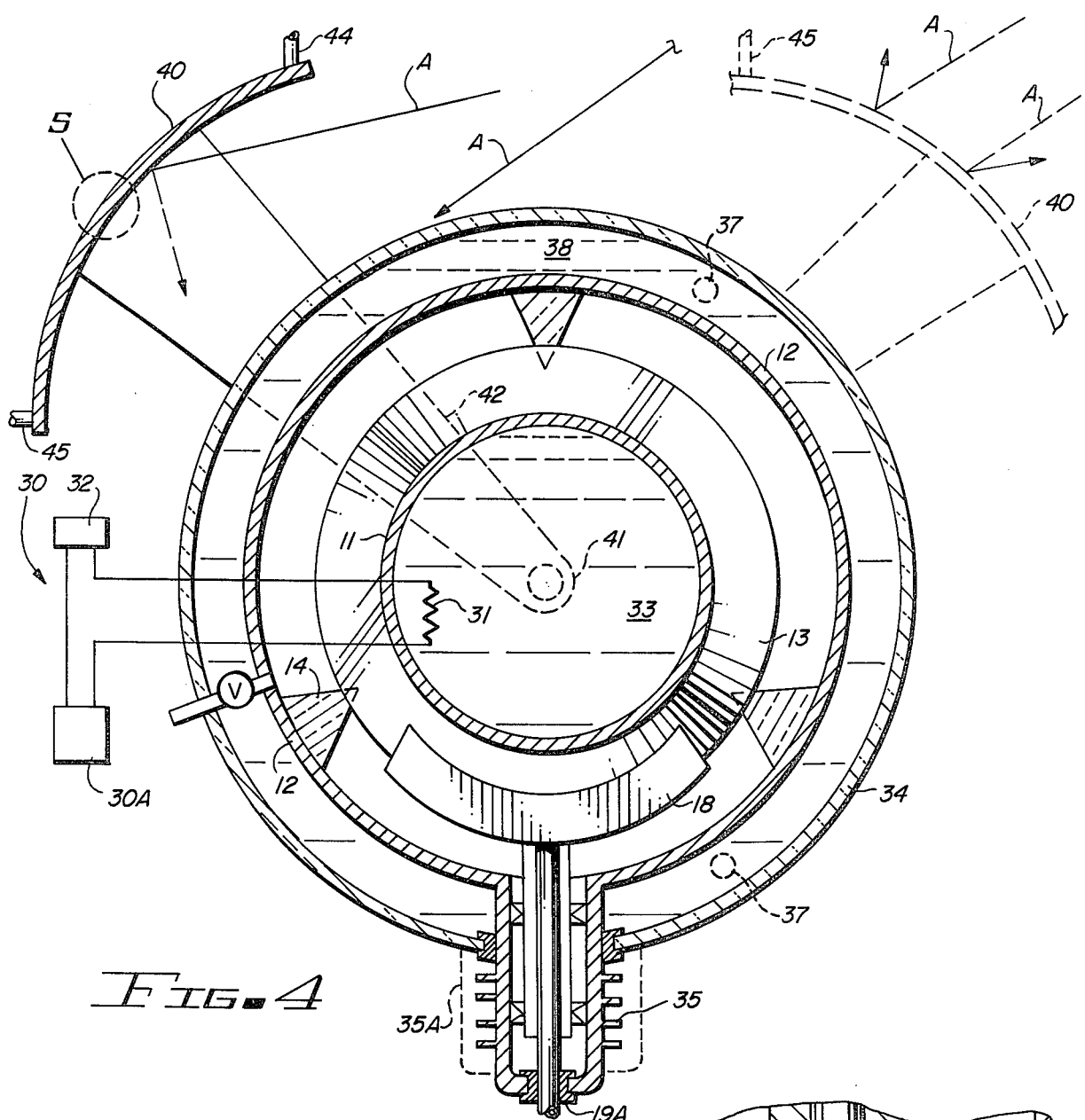
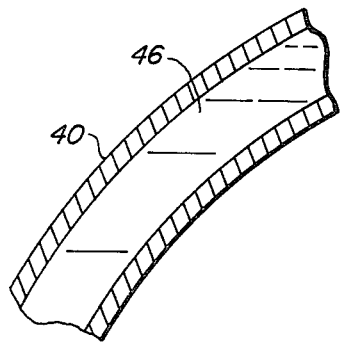
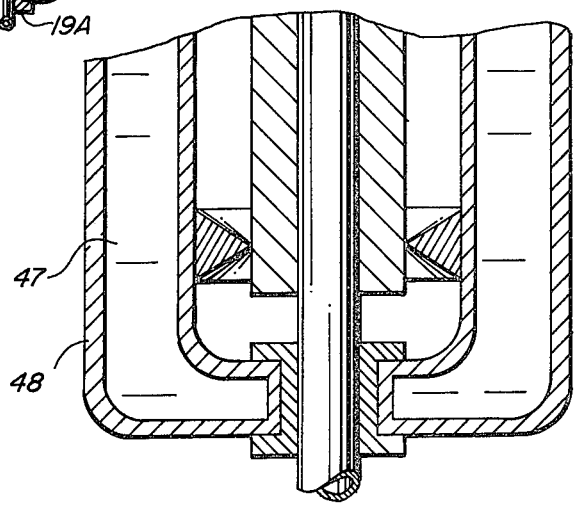
Fig. 4
Fig. 5
Fig. 6

CONCENTRATING VACUUM ISOLATED SOLAR ENERGY COLLECTION APPARATUS EMPLOYING REFLECTOR

BACKGROUND OF THE INVENTION

The rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate but it becomes increasingly evident that these efforts are inadequate to keep pace with the demands of the growing population.

Until recently, the development of solar energy collectors for commercial use has been largely directed to the flat plate collector which is made of metal and glass with one or more layers of glass laid over a blackened plate. Air spaces are provided between layers of glass and air or water passes through these tubes under the metal plate to remove the collected energy. The layers of glass in cooperation with the blackened plate act as a heat trap, letting in the sun's rays but keeping most of the heat from escaping again.

A major disadvantage of the flat plate collector is that it must be very large in order to collect sufficient energy, the large size resulting in part from the fact that except for brief periods during the day its surface is not perpendicular to the rays of the sun.

PRIOR ART

Parabolic reflectors have been utilized in the past along with sun-tracking mechanism in connection with various schemes for the collection, conversion and utilization of solar energy. Variations of such equipment are described in U.S. Pat. Nos. 1,162,505; 2,803,591; 3,118,437 and 4,000,734.

Further, the inventor of this application has filed a parent application Ser. No. 31,467 entitled "Concentrating Vacuum Insulated Solar Energy Collection Apparatus" in the U.S. Patent and Trademark Office on Apr. 19, 1979, the disclosure of which is incorporated herein by reference.

Heretofore, heat exchangers, particularly of the type adapted to collect cold or heat, have been constructed either with a series of tubes embedded in a flat reflective surface or have comprised a curved or semi-cylindrical reflector with a round tube mounted at approximately its focal point with U.S. Pat. Nos. 1,946,184 and 3,847,136 being representative thereof. Relative to this latter form of the prior art, fins or vanes have been mounted about the tube in an effort to obtain more efficiency from the unit.

At best, the prior art heat exchangers have been extremely inefficient even to the point where it is necessary to incorporate thereinto an elaborate system of gears and racks or other means to shift or otherwise change the position of the exchange or collector unit so that its relative position to the source of heat will remain constant.

While such prior art inventions do suggest workable approaches for the realization of the important objectives involved, the particular implementation described in these patents have in general fallen short of what is required in a low-cost and practical system.

Summary of the Invention

In accordance with the invention claimed, an improved vacuum isolated solar energy collecting and converting apparatus is provided which is compact, inexpensive and efficient by virtue of its uniquely designed configuration.

It is, therefore, one object of this invention to provide an improved vacuum isolated heat energy accumulator, storage and converting apparatus which employs reflective means for selectively collecting and converting solar energy through a vacuum isolating shield.

Another object of this invention is to provide a compact and inexpensive solar energy collecting apparatus employing a means for supporting a vacuum enveloping housing around the energy collecting structure and employing a novel refractive housing and reflective shield.

A further object of this invention is to provide such an inexpensive solar energy collector structure which achieves maximum energy collection throughout the day without the need of an expensive solar tracking mechanism.

A still further object of this invention is to provide a novel heat retrieving mechanism which selectively transmits this form of energy back through the vacuum with little or no radiational loss thereof.

A still further object of this invention is to provide a protective cooling means around the accumulator for accommodating intensified solar rays passing therethrough and into the accumulator core and serving as a preheating means for other utilitarian use.

Further objects and advantages of this invention will become apparent as the following description proeeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective view of a solar ray accumulator arranged within a solar ray concentrator and employing a movable fluid conducting reflector;

FIG. 2 is a cross-sectional view of FIG. 1 taken along the line 2—2;

FIG. 3 is a cross-sectional view of FIG. 2 taken along the line 3—3;

FIG. 4 is a cross-sectional view of FIG. 1 taken along the line 4—4;

FIG. 5 is an enlargement of the circled area in FIG. 4 identified by the reference numeral 5; and FIG. 6 is a cross-sectional view of a modification of the bearing structure for the shaft of the movable shoe shown in FIGS. 1 and 5.

DESCRIPTION OF THE PREFERRED EMBODIMENT

Referring more particularly to the drawing by characters of reference, FIGS. 1-4 disclose a solar energy collection and conversion apparatus 10 utilizing a pair of coaxially arranged spacedly positioned close ended cylinders 11 and 12 which are maintained in this spaced arrangement by a plurality of intersecting spacers 13 and 14. These spacers, as shown more clearly in FIG. 4, comprise triangular configurations, the apexes of which intersect in a lateral manner so as to maintain between the outer surface 11A of cylinder 11 and the inner surface 12A of cylinder 12 a space 15 which is maintained in a suitable vacuum condition by withdrawing the air or atmosphere therebetween by a suitable vacuum pump and its control means (not shown) through a suitable valve 16. The spacers may comprise anticline and syncline configurations.

The spacers 13 and 14 maintain the two cylinders 11 and 12 in a given spaced arrangement but each spacer, strut or separating means forms a conductive path for the flow of energy, i.e, heat, cold or the like from one wall or surface of the other cylinder and vice versa across the space 15.

Accordingly, the number of spacers and their design configuration should be so configured to limit and control the number of such paths and the size thereof to control the energy flow therealong. The A-shaped configuration of the spacers 13 and 14 provides a strong and reinforced support for the closely positioned walls while limiting the energy flow paths through the reinforcements between the cylinders. It should be noted that the apexes of the reinforcements 13 engage the apexes of the reinforcements 14. This limited substantially lined or limited area contact between the reinforcements greatly limits the energy flow path between the cylinders and thereby preserves the energy of the retaining cylinder.

In the embodiment shown in FIGS. 1, 2 and 3, the inner cylinder 11 is intended to contain a suitable medium which may be water or any other fluid filling or partially filling cylinder 11 which is intended to be heated by the sun's rays penetrating the walls of the outer cylinder and the vacuum space 15 and impinging on the walls of the cylinder 11. The walls of cylinder 11 may be transparent or of black absorbing character so that by absorption, conduction or otherwise, the ray of the sun may be absorbed by the cylinder walls and the medium inside of it and converted into heat energy. If so desired, part of the walls of cylinder 11 may be transparent or opaque, as desired.

The outer cylindrically shaped cylinder 12 is transparent and acts as a refractor for the sun's rays directing these rays, striking its outer surface obliquely, through its walls to the inner cylinder 11. If the outer cylinder 12 is substantially larger than cylinder 11, solar rays are collected by cylinder 12 and through refraction, directed to cylinder 11 thereby reducing the need for reflector collecting devices. Since the outer cylinder 12 may be a hollow shell and contain a liquid moving through the shell, cylinder 12 may be adequately cooled thereby reducing the deteriorating effect of the heat of the sun's rays. The heat is due to the intensified reflected and refracted light received by it.

Thus, the inner cylinder becomes a heat absorber, intensifier or accumulator with little if any loss of its heat by radiation or conduction since it is encased in a vacuum formed between inner and outer cylinders 11 and 12. It should be noted that the inner cylinder continues to intensify in temperature since very little heat is lost through the spacers or reinforcements 13 and 14.

In order to retrieve the heat energy from the inner cylinder when needed, an energy transfer means 17 is provided. This transfer means may comprise any suitable means but for purpose of illustration is shown as a brake shoe like structure 18 arranged within the space 15 between the cylinders 11 and 12 which is reciprocally mounted so as to engage with the outer periphery of cylinder 11 and move away therefrom. One suitable means for moving the shoe-like structure 18 into engagement with cylinder 11 and away therefrom may comprise an attached electric motor 19, the rotor 20 of which is threadedly connected by means of a shaft 21 through the walls of the outer configuration 12. Rotation of motor 19 in one direction causes the shoe-like structure 18 to engage the outer periphery of the inner cylinder 11 and through conduction transfer the heat energy of the medium of cylinder 11 into the shoe-like structure 18 and through the bearing and guiding shafts, flexible hoses or pipes 22 and 23 of the transfer means 17 to a heat utilization apparatus (not shown).

As shown in FIGS. 2 and 4, the shoe-like structure may be of an arcuate configuration so that it conforms to the outer surface of the inner cylinder when in engagement therewith.

In order to more readily transfer the heat of the inner cylinder 11 to a heat utilizing means, the shoe-like structure 18 is shown as a hollow configuration through which water or other fluid flows by means of pipes 22 and 23 absorbing by conduction the heat of cylinder 11 and transporting this heat through the vacuum space 15 to the outside world.

Although a motorized means is used to move the shoe-like structure to and from cylinder 11, it should be recognized that a suitable hand lever or crank may be used, if so desired.

The controls 25' for the transfer means 17 selectively control the direction of rotation of motor 19 and the operation of pump 26 which circulates water through the shoe-like structure 18 when the structure is in engagement with the outer periphery of the inner cylinder 11. It should be recognized that although two coaxial cylinders 11 and 12 are shown, these cylinders may be one within the other but not coaxially aligned and still fall within the scope of this invention. Further, the cylinders could be replaced by any other geometrical configuration, such as, for example, hollow spheres, prisms and the like.

It should be noted that an electrical switching means 30 and the associated heating means 31 shown in FIG. 9 of the copending application and FIG. 4 of this application may be utilized to heat the interior of cylinder 11 for compensating for the lack of sun or cloudy days. A solar ray sensor 33 connected thereto could be used to energize the heating resistance when the sun is not shining enough to heat the inner object sufficiently.

Energization of the resistance 31 will also provide a way to heat the contents 33 of cylinder 11 so that heat may be stored in cylinder 11, as desired, from a public utility at a time when the rates are the lowest and used when needed such as during cloudy days when solar energy is not available or to boost a dissipated stored solar energy supply.

It should be noted that cylinder 11 could be of a solid material and could accumulate energy from the sun until it became unstable when the vacuum surrounding it is maintained. p To eliminate a too high stored energy level of either the inner cylinder 11 or outer cylinder 12 whether it comprises a solid member or a hollow member containing a suitable fluid, suitable controls such as controls 25' shown in FIG. 1 may be used to move the shoe-like configurations 18 into contact with the inner cylinder 11 when desired to bleed off excess heat. This excess heat can be then transmitted to a suitable storage device outside of the heat exchange means 10. A cover 34 may be concentrically mounted around outer cylinder 12 to form a transparent or opaque cover for the accumulator and may shade or partially shade the apparatus from the sun if the temperature in the inner cylinder becomes too hot. Further, it may be hollow and fluid conductive, if so desired.

Further, it should be noted that an external source of heat may be used such as, for example, a waste steam byproduct, goethermal energy, and other forms which may be conducted through the shoe-like configuration 18 when in contact with cylinder 11 for heating the inner cylinder 11 whether hollow containing a liquid or solid. When heated, the inner cylinder then may serve as a source of heat for withdrawal later and used through the shoe-like configuration 18 in the manner disclosed.

As shown more clearly in FIGS. 2 and 3, the hollow pipes or shafts 22 and 23 which form the ingress and egress passages for fluid through the hollow interior of the shoe-like structure 18 are each insulatingly covered by a finned housing 35, the hollow interior of which is in communication with the hollow vacuumed area 36 arranged between cylinders 11 and 12. Each of the shafts 22 and 23 are spacedly arranged within the hollow interior of housing 35 by a pair of spacers or reinforcements 13' similar to spaces or reinforcements 13, shown in FIG. 1. A hollow housing 35A may cover the fins as shown in dash lines in the drawing for containing a fluid moving therethrough for cooling purposes, if so desired.

A similar housing 36 may be formed around the threaded drive shaft 19A of motor 19 to keep it from overheating and conducting heat away from outer wall or cylinder 12.

It should be noted that the space between cover 34 and outer cylinder 12 may be used to hold heat and transmit outwardly thereof through a pipe 37 suitable fluid 38 such as gas or water as a further heat generating means. In other words, some of the heat directed to the inner cylinder 11 may be captured in fluid 38 and used for a useful purpose prior to its reaching the inner cylinder 11 of the accumulator 10.

In accordance with the teachings of this invention, one or more pivotally mounted reflecting means 40 may be provided which is attached to the ends of the housing 34 by suitable pins 41 through a pair of arms 42 one positioned at each end of the apparatus. This reflecting means may comprise an arcuate configuration having an arcuate or concave inner reflecting and concentrating surface 43 which may be manually or automatically positioned at various arcuate positions around the apparatus to capture and reflect the sun's rays onto housing 34 and in turn the inner cylinder 11, as shown by the arrows A in FIG. 4. The dash line illustration of the reflecting means 40 indicates the positioning and use of this device for sun shielding purposes when the accumulator has reached its temperature limit.

It should be noted that a concave reflector positioned a sufficient distance from the outer cylinder 12 and of sufficient arcuate configuration can reflect light to the accumulator at all times from rising to setting sun.

As evident from FIGS. 4 and 5, the pivotally mounted reflective means 40 may comprise a hollow configuration that is capable of receiving through port 44 and exiting through port 45 a suitable fluid 46 which is heated by the rays of the sun prior to the rays being concentrated and reflected through the transparent housing 34, the medium between the inner periphery of housing 34 and outer cylinder 12 to the inner cylinder 11 forming the accumulator.

FIG. 6 is a modification of the bearing assembly shown in FIGS. 1 and 4 wherein the hollow space 47 in housing 48 is in communication with the space 38 within cover 34. This space improves the isolating qualities of housing 48 for the movable shaft 19A of shoe-like structure 18.

Although but a few embodiments of the invention have been illustrated and described, it will be apparent to those skilled in the art that various changes and modifications may be made therein without departing from the spirit of the invention or from the scope of the appended claims.

What is claimed is:

1. An improved heat exchange means comprising:
   a pair of concentrically arranged inner and outer spaced, closed objects,
   said inner object comprising a material to be heated by solar rays impinging on at least a part of its outer periphery,
   the space between said objects containing less than atmospheric pressure therein,
   said outer object being at least partially transparent for transmitting solar rays to said inner object,
   an energy transfer means arranged within the space between said objects for selectively moving into contact with and away from the outer periphery of said inner object,
   a control means for selectively controlling the movement of said energy transfer means, and
   a cover spacedly positioned and coaxially arranged around said inner and outer objects,
   said cover defining between it and the outer periphery of said outer object a fluid conducting space.

2. The improved heat exchange means set forth in claim 1 wherein:
   said inner object comprises a hollow configuration.

3. The improved heat exchange means set forth in claim 1 wherein:
   said control means comprises a sensor connected to said inner object for moving said energy transfer means into contact with said inner object when its temperature reaches a predetermined value for transferring away from it excess heat.

4. The improved heat exchange means set forth in claim 1 wherein:
   said energy transfer means comprises a hollow configuration having input and output fluid bearing pipe means for conducting fluid through said hollow configuration for heat absorption by the fluid flowing therethrough when said energy transfer means is in contact with said inner object.

5. The improved heat exchange means set forth in claim 1 wherein:
   said objects comprise cylindrical configurations.

6. The improved heat exchange means set forth in claim 1 wherein:
   said energy transfer means comprises an elongated arcuate configuration having a curvature substantially identical to the outer periphery of said inner object at their point of engagement.

7. The improved heat exchange means set forth in claim 1 in further combination with:
   a reflector pivotally mounted on said cover for reflecting to said heat exchange means solar rays.

8. The improved heat exchange means set forth in claim 7 wherein:
   said reflector comprises a concave configuration.

9. The improved heat exchange means set forth in claim 7 wherein:
said reflector comprises a hollow configuration for conducting fluid therethrough.

10. The improved heat exchange means set forth in claim 1 in further combination with:
structural reinforcing means arranged on the periphery of at least one of said objects for holding said objects in spaced arrangement and forming substantially a limited contact between said objects for controlling energy flow between said objects.

11. The improved heat exchange means set forth in claim 10 wherein:
said reinforcing means comprises a closed triangular configuration having its base attached to the periphery of one of said objects and the apex engaging the other of said objects.

12. The improved heat exchange means set forth in claim 10 wherein:
said reinforcing means comprises at least a pair of closed ended triangular members,
one of said members having its base secured to the outer periphery of said inner object and the other of said members having its base secured to the inner periphery of said outer object,
said members extending around the associated object forming a closed configuration and one positioned to pass laterally of the other so that their apexes intersect.

13. The improved heat exchange means set forth in claim 10 wherein:
said reinforcing means comprises at least two pairs of closed ended triangular members,
each member of each pair being spaced from the other and extend around the associated object with the bases of the triangular configuration secured to the surface of the associated object,
said pairs of reinforcing means being positioned to cause their apexes to intersect with the apexes of the other pair of reinforcing means to form a line contact.

14. The improved heat exchange means set forth in claim 7 wherein:
said reflector comprises a hollow configuration for conducting a fluid therethrough.

* * * * *